US010935972B2

(12) United States Patent
Greenberger et al.

(10) Patent No.: US 10,935,972 B2
(45) Date of Patent: *Mar. 2, 2021

(54) MANAGING AVAILABLE ENERGY AMONG MULTIPLE DRONES

(71) Applicant: INTERNATIONAL BUSINESS MACHINES CORPORATION, Armonk, NY (US)

(72) Inventors: Jeremy A. Greenberger, San Jose, CA (US); Christopher J. Hardee, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,695

(22) Filed: Feb. 22, 2019

(65) Prior Publication Data
US 2019/0187695 A1 Jun. 20, 2019

Related U.S. Application Data

(63) Continuation of application No. 15/433,105, filed on Feb. 15, 2017, now Pat. No. 10,310,501.

(51) Int. Cl.
*G05D 1/00* (2006.01)
*G06Q 10/08* (2012.01)
(Continued)

(52) U.S. Cl.
CPC ......... *G05D 1/0027* (2013.01); *B64C 39/024* (2013.01); *G06Q 10/083* (2013.01);
(Continued)

(58) Field of Classification Search
CPC ..... G05D 1/0027; H02J 7/342; B64C 39/024; G06Q 10/083; G08G 5/0043; G08G 5/0069
(Continued)

(56) References Cited

U.S. PATENT DOCUMENTS 3,656,723 A 4/1972 Piasecki et al.
5,906,336 A 5/1999 Eckstein
(Continued)

FOREIGN PATENT DOCUMENTS

WO WO2015092389 A1 6/2015

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).
(Continued)

*Primary Examiner* — Peter D Nolan
*Assistant Examiner* — Luat T Huynh
(74) *Attorney, Agent, or Firm* — Michael A. Petrocelli, Esq.; Kevin P. Radigan, Esq.; Heslin Rothenberg Farley & Mesiti P.C.

(57) ABSTRACT

Management of available energy among multiple drones is provided by identifying tasks to be completed by the multiple drones, and determining energy requirements of one or more drones of the multiple drones to facilitate completing one or more tasks of the tasks to be completed by the multiple drones. Further, the approach includes identifying an energy sharing approach for completion of the task(s) by the drone(s) where one or more other drones of the multiple drones transfer energy in operation to the drone(s) to facilitate completion of the task(s). In operation, the multiple drones may be detachably coupled, and the approach may include implementing the energy sharing approach by transferring energy from the other drone(s) to the drone(s) to facilitate completion of the task(s), for instance, prior to decoupling of the other drone(s) from the drone(s).

9 Claims, 8 Drawing Sheets

(51) Int. Cl.
*G08G 5/00* (2006.01)
*B64C 39/02* (2006.01)
*H02J 7/34* (2006.01)

(52) U.S. Cl.
CPC ......... *G08G 5/0043* (2013.01); *G08G 5/0069* (2013.01); *H02J 7/342* (2020.01); *B64C 2201/027* (2013.01); *B64C 2201/06* (2013.01); *B64C 2201/108* (2013.01); *B64C 2201/128* (2013.01)

(58) Field of Classification Search
USPC .......................................................... 701/2
See application file for complete search history.

(56) References Cited

U.S. PATENT DOCUMENTS

| | | | |
|---|---|---|---|
| 7,699,260 B2 * | 4/2010 | Hughey | B64C 31/028 244/17.11 |
| 8,296,036 B2 | 10/2012 | Matuszeski et al. | |
| 8,370,003 B2 | 2/2013 | So et al. | |
| 8,749,196 B2 | 6/2014 | Cohen et al. | |
| 9,043,052 B2 | 5/2015 | So et al. | |
| 9,102,406 B2 | 8/2015 | Stark et al. | |
| 9,340,299 B2 | 5/2016 | Yates et al. | |
| 9,346,560 B2 | 5/2016 | Wang | |
| 9,421,869 B1 | 8/2016 | Ananthanarayanan et al. | |
| 10,139,838 B2 | 11/2018 | Lection et al. | |
| 2004/0030448 A1 | 2/2004 | Solomon | |
| 2012/0234964 A1 | 9/2012 | Heppe | |
| 2014/0374532 A1 * | 12/2014 | Duffy | G05D 1/104 244/2 |
| 2015/0120094 A1 | 4/2015 | Kimchi et al. | |
| 2015/0242972 A1 | 8/2015 | Lemmey et al. | |
| 2016/0378108 A1 * | 12/2016 | Paczan | G06Q 10/083 705/330 |
| 2017/0117676 A1 | 4/2017 | James et al. | |
| 2018/0231971 A1 | 8/2018 | Greenberger et al. | |
| 2019/0127063 A1 * | 5/2019 | Gozluklu | B64C 39/024 |

OTHER PUBLICATIONS

IBM, "z/Architecture Principles of Operation," IBM® Publication No. SA22-7832-10, Eleventh Edition, Mar. 2015, (pp. 1-1732).
IBM, "Power ISA™ Version 2.07B," International Business Machines Corporation, Apr. 9, 2015, (pp. 1-1527).
Pace et al., "Management and Coordination Framework for Aerial-Terrestrial Smart Drone Networks", SmartObjects 15, Proceedings of the 1st International Workshop on Experiences with the Design and Implementation of Smart Objects, Paris, France, Sep. 7, 2015, (pp. 37-42).
Greenberger et al., "Managing Available Energy Among Multiple Drones", U.S. Appl. No. 16/282,712, filed Feb. 22, 2019 (47 pages).
Greenberger et al., "Managing Available Energy Among Multiple Drones", U.S. Appl. No. 16/282,726, filed Feb. 22, 2019 (47 pages).
Greenberger et al., "List of IBM Patents and/or Patent Applications Treated as Related", U.S. Appl. No. 16/282,695, filed Feb. 22, 2019, dated Feb. 25, 2019 (2 pages).

* cited by examiner

MANAGING AVAILABLE ENERGY AMONG MULTIPLE DRONES

BACKGROUND

An issue to be addressed in a practical implementation of a drone (e.g., unmanned aerial vehicle (UAV)) based delivery system is that the current state of the art drones have limited carrying or payload capacity. Further, drones typically have limited travel ranges.

Currently, if a particular number of orders (or products) are to be delivered at about the same time, then the same number of drones will be needed (i.e., each order will be delivered by an individual drone), and in most instances, many if not all, of the drones used will have the same carrying capacity and range. For instance, all the drones used may be identical type drones. However, because the delivered products may vary in size and weight, some of the drones may essentially be underutilized and/or the overall power use or consumption of the system will not be optimized, potentially limiting the travel ranges and/or carrying capacities of the drones.

SUMMARY

The shortcomings of the prior art are overcome and additional advantages are provided through the provision herein of a method of managing available energy among multiple drones. The method includes identifying tasks to be completed by the multiple drones, and determining energy requirements of one or more drones of the multiple drones to facilitate completion of one or more tasks of the tasks to be completed by the multiple drones. Further, the method includes identifying an energy sharing approach for completion of the task(s) by the drone(s) where one or more other drones of the multiple drones transfer energy in operation to the drone(s) to facilitate completion of the task(s). Further, the determining includes determining a respective route for each drone, each respective route including a route portion where the multiple drones travel as a coupled collective of drones, and the determining includes determining energy requirements of each drone of the multiple drones for completion of a respective task of the multiple tasks to be completed by the multiple drones. In addition, the determining includes determining any lifting requirements for each drone of the multiple drones for completion of the respective task, and a total distance of each respective route of the multiple drones, and determining an expected amount of energy each drone will require for completion of the drone's respective tasks. Based thereon, the determining includes identifying the energy sharing approach to facilitate transfer of energy from the other drone(s) to the drone(s) while in operation to facilitate completion of the task(s), while retaining sufficient energy for completion of one or more other tasks by the other drone(s). The other task(s) is one or more other tasks of the tasks to be completed by the multiple drones.

In another aspect, a system is provided for managing available energy among multiple drones. The system includes a memory, and a processor communicatively coupled to the memory. The system performs a method, including identifying tasks to be completed by the multiple drones, and determining energy requirements of one or more drones of the multiple drones to facilitate completion of one or more tasks of the tasks to be completed by the multiple drones. Further, the method includes identifying an energy sharing approach for completion of the task(s) by the drone(s) where one or more other drones of the multiple drones transfer energy in operation to the drone(s) in operation to facilitate completion of the task(s). Further, the determining includes determining a respective route for each drone, each respective route including a route portion where the multiple drones travel as a coupled collective of drones, and the determining includes determining energy requirements of each drone of the multiple drones for completion of a respective task of the multiple tasks to be completed by the multiple drones. In addition, the determining includes determining any lifting requirements for each drone of the multiple drones for completion of the respective task, and a total distance of each respective route of the multiple drones, and determining an expected amount of energy each drone will require for completion of the drone's respective tasks. Based thereon, the determining includes identifying the energy sharing approach to facilitate transfer of energy from the other drone(s) to the drone(s) while in operation to facilitate completion of the task(s), while retaining sufficient energy for completion of one or more other tasks by the other drone(s). The other task(s) is one or more other tasks of the tasks to be completed by the multiple drones.

In a further aspect, computer program product for managing available energy among multiple drones is provided. The computer program product includes a computer readable storage medium having computer readable program code embodied therewith, the computer readable program code being executable by a processor to perform a method, including: identifying tasks to be completed by the multiple drones; determining energy requirements of one or more drones of the multiple drones to facilitate completing one or more tasks of the tasks to be completed by the multiple drones; and identifying an energy sharing approach for completion of the task(s) by the drone(s) where one or more other drones of the multiple drones transfer energy in operation to the drone(s) to facilitate completion of the task(s). Further, the determining includes determining a respective route for each drone, each respective route including a route portion where the multiple drones travel as a coupled collective of drones, and the determining includes determining energy requirements of each drone of the multiple drones for completion of a respective task of the multiple tasks to be completed by the multiple drones. In addition, the determining includes determining any lifting requirements for each drone of the multiple drones for completion of the respective task, and a total distance of each respective route of the multiple drones, and determining an expected amount of energy each drone will require for completion of the drone's respective tasks. Based thereon, the determining includes identifying the energy sharing approach to facilitate transfer of energy from the other drone(s) to the drone(s) while in operation to facilitate completion of the task(s), while retaining sufficient energy for completion of one or more other tasks by the other drone(s). The other task(s) is one or more other tasks of the tasks to be completed by the multiple drones.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The description that follows includes exemplary devices, systems, methods, techniques and instruction sequences that embody techniques of the present invention. However, it should be understood that the described invention may be practiced, in one or more aspects, without the specified details. In other instances, note that known protocols, structures and techniques have not been shown in detail in order not to obscure the invention. Those of ordinary skill in the art will appreciate that the described techniques and mechanisms may be applied to various systems to facilitate a managing available energy among multiple drones, in accordance with one or more aspects of the present invention.

Further, those of ordinary skill in the art will appreciate that one or more aspects of the present invention are described herein by way of example only with reference to drone tasks centered on delivery of orders or products. Note that more generally, the drones may be performing any identified tasks, such as, for instance, (aerial) surveillance of different geographic regions, as well as other tasks. The discussion herein with reference to delivery of product or orders, is provided by way of example only.

In one or more implementations, based on customer orders being received (e.g., by customers placing orders), products or goods may be loaded onto drones for delivery. In certain embodiments, each product may be loaded onto a respective drone. However, it should be understood that, depending on the size and weight of the products, multiple products may be loaded onto a single drone when suitable (e.g., a single customer may have placed an order for multiple relatively small, light products). The products may be loaded onto the drones at a first location, such as a warehouse where the products are stored.

Figure 1:
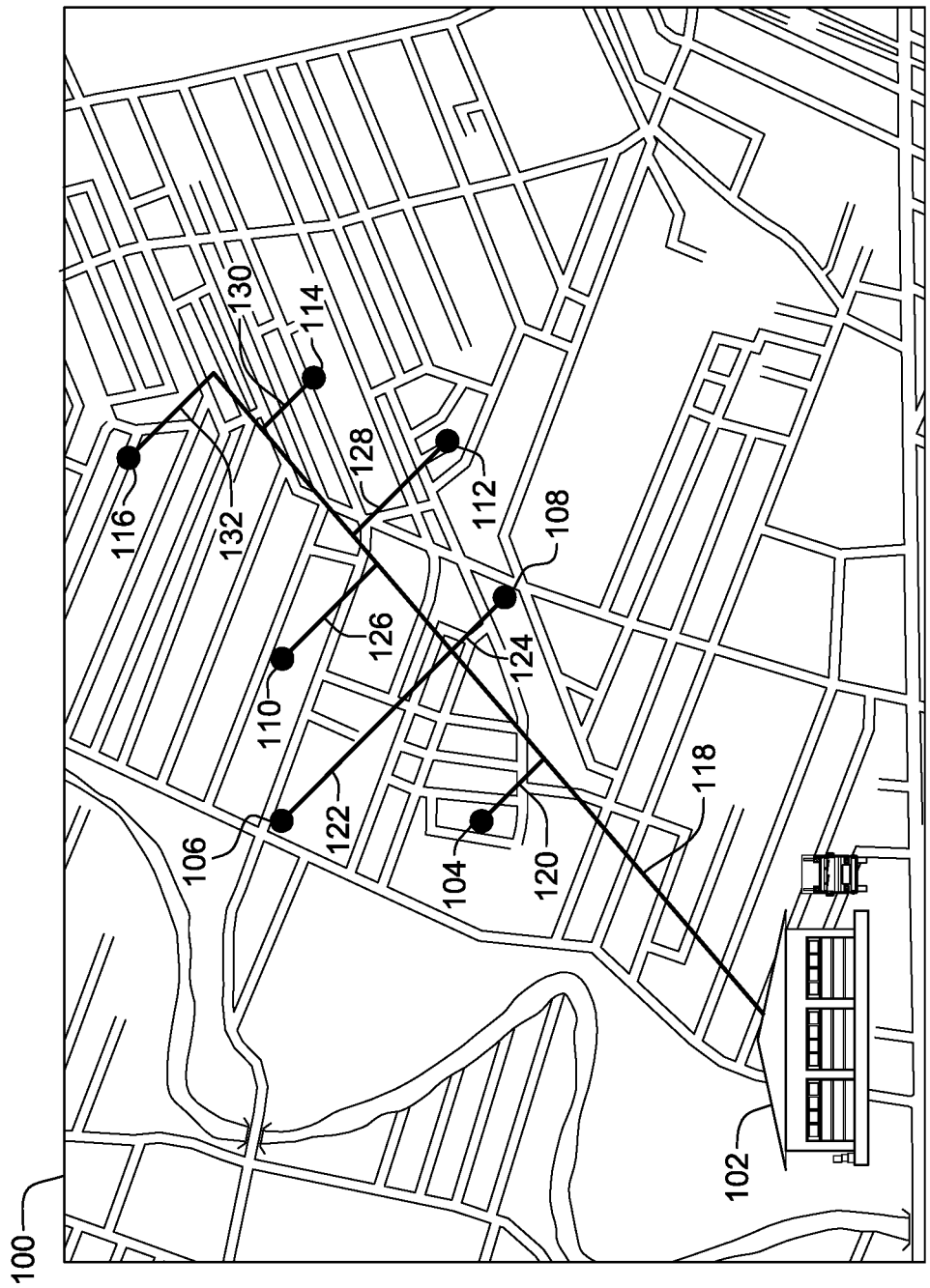
FIG. 1 depicts one embodiment of a map with drone routes indicated thereon, where the drones have available energy managed, in accordance with one or more aspects of the present invention.

Referring to FIG. 1, a map 100 of a geographic region is shown. On the map 100, the location of a warehouse (or first location) 102 and the locations of multiple delivery points (e.g., customer addresses) 104-116 associated with customer orders that have been received are shown. In one or more embodiments, a main delivery route 118 may be determined, which will be used by a coupled collective of drones described herein. The main delivery route 118 may be determined in such a way that the overall efficiency (e.g., with respect to energy consumption) of the delivery system is optimized. As such, it should be noted that in the example shown in FIG. 1, the main delivery route 118 is essentially in the shape of a straight line extending through the middle of the various delivery points 104-116. Also shown in FIG. 1 are various secondary (or auxiliary) delivery routes 120-132, which are be used by the individual drones to deliver respective products to delivery points 104-116. In one or more embodiments, the system(s) described herein controls the drones in the manner(s) described below and/or otherwise enables or causes the various functionalities described to be performed.

In one or more implementations, at warehouse 102 (i.e., the first location), the products may be loaded onto the respective individual drones, and the drones may be coupled to each other (e.g., as described in greater detail below). Two or more drones coupled together in this manner are referred to herein as a coupled collective of drones. After the drones are coupled together, the coupled collective may leave warehouse 102 and travel along the main delivery route 118, bringing the various products stored on the individual drones with them.

When the coupled collective of drones reaches an intersection of the main delivery route 118 with one of the secondary delivery routes 120-132, one or more of the individual drones detach (or are detached) from the collective and travel along the respective secondary delivery route 120-132 to, for instance, deliver the product(s) stored thereon to the appropriate delivery point 104-116. For example, when the coupled collective of drones reaches the intersection of the main delivery route 118 with secondary delivery route 120, one (or more) of the individual drones detaches and travels along secondary delivery route 120 until it reaches delivery point 104, where, for instance, it delivers the product stored thereon.

In one or more embodiments, after (e.g., immediately after) the individual drone detaches from the collective, the coupled collective continues along the main delivery route 118. In the exemplary embodiment shown in FIG. 1, when the collective reaches the intersection of the main delivery route 118 with secondary routes 122 and 124, two more individual drones may detach and travel along the respective secondary delivery routes 122 and 124 to, for instance, deliver products stored thereon to delivery points 106 and 108, respectively. After these drones detach from the collective, the remaining drones of the coupled collective again continue along the main delivery route 118 towards the intersections of the main delivery route 118 with secondary routes 126, 128, 130, and 132. At each of these intersections, individual drones may detach from the collective to, for instance, make deliveries to delivery points 110, 112, 114, and 116 in the manner described above.

Thus, as the coupled collective travels along the main delivery route 118, individual drones may detach, and depart, from the other drones and travel to the respective delivery points 104-116. In one or more embodiments, when the individual drones are connected to (and/or form part of) the coupled collective of drones, they are able to travel (e.g., fly) in such a way that energy may be conserved as described in greater detail below. As a result, the energy consumption of the individual drones (or the collective of drones) may be minimized, and/or the range of the individual drones may be extended (e.g., when compared to the range of the individual drones if traveling detached from the composite drone during the entire delivery process).

Still referring to FIG. 1, it should be noted that the last delivery (e.g., to delivery point 116) may be made by only one drone remaining. That is, in certain embodiments, the number of individual drones may be the same as the total number of tasks to be performed, such as deliveries to be made (e.g., seven, in the example of FIG. 1). However, in one or more embodiments, the number of individual drones that form the collective may be greater than the total number of tasks (e.g., deliveries). In such an example, after an individual drone detaches from the collective to make the last delivery (e.g., to delivery point 116), there may be one or more individual drones still connected to (and/or part of) the coupled collective.

After transporting the respective products to the delivery points 104-116, the individual drones may return via the main delivery route 118 to warehouse 102 or simply travel to another location. In one or more embodiments, after making the respective deliveries, the individual drones return to the main delivery route 118 and are reattached to the collective, or to at least one other individual drone, before travelling to another location (e.g., the warehouse 102). However, in some embodiments, depending on various factors such as distance, energy consumption, etc., the individual drones may travel to another location without being reattached to other drones. Whether or not a particular individual drone is reattached to another individual drone (and/or the composite drone) may be based on, for example, the distance between the respective delivery point and the warehouse (or another location where the drones are to be stored and/or retrieved).

For example, still referring to FIG. 1, the individual drone that makes the delivery to delivery point 104 may return to the warehouse 102 without being reattached to other individual drones because delivery point 104 is relatively close to the warehouse 102. However, because delivery points 114 and 116 are significantly farther away from the warehouse 102, the individual drones that make deliveries to those delivery points may be reattached to each other (and/or to other individual drones or to the remaining drones of the collective) before returning to the warehouse 102 in order to, for example, reduce energy consumption and/or extend the range of those individual drones.

Figure 2:
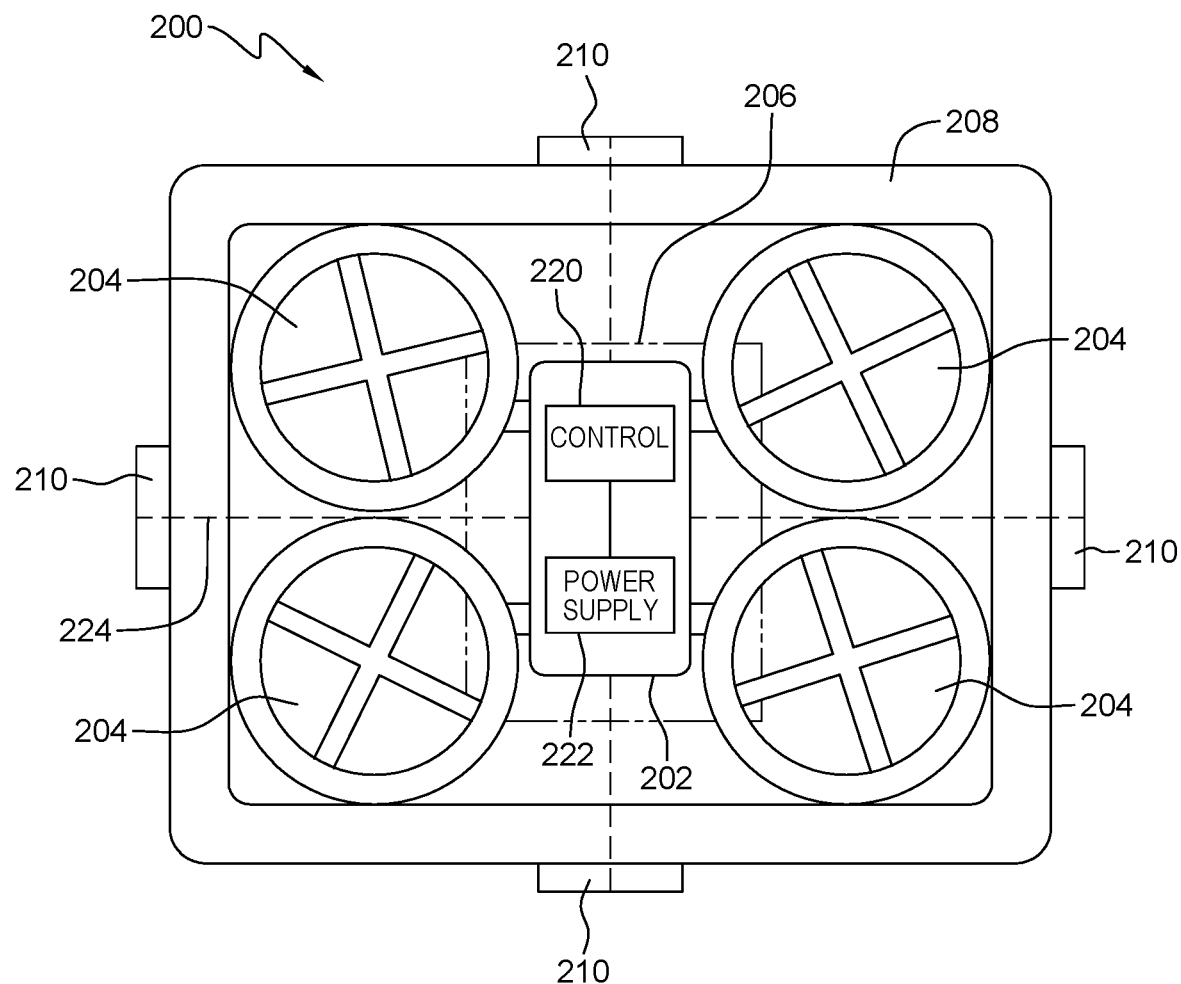
FIG. 2 is a plan view of one embodiment of a drone configured to facilitate management of available energy, for instance, when in a coupled collective of drones, in accordance with one or more aspects of the present invention.

FIG. 2 is a plan view of one embodiment of a drone (e.g., an individual drone) 200, in accordance with one or more aspects of the present invention. In the depicted embodiment, drone 200 is a UAV type drone, and includes a fuselage 202, rotors 204, a payload compartment 206, and a frame 208. As is shown, in the depicted embodiment, fuselage 202 is located at a central portion of the drone 200, and may include (e.g., in an interior compartment) a computing device or control 220, a transceiver (not shown), a power supply 222 (e.g., a battery), as well as energy transfer lines 224 for use as described herein. Control 220 may, for instance, facilitate control of the flight of the drone 200, the drop/release of product(s), or the performing of one or more other tasks, as well as the coupling of the drone to other drones, for instance, in a coupled collective, and facilitate the managing of available energy among multiple coupled drones, as described herein.

In the depicted embodiment, drone 200 includes four rotors 204 (e.g., the drone 200 is a quad-copter), which are, for example, connected to the fuselage and spaced in pairs on opposing sides of fuselage 202 in a substantially rectangular configuration. However, it should be understood that drone 200 shown in FIG. 2 is just an example of the type and shape of drone that may be used in the systems and methods described herein. Other suitable drones may have different propulsion systems and shapes (e.g., hexagonal, circular, etc.) with coupling mechanisms (described below) spaced, for example, evenly around a periphery thereof.

Although not shown in detail, each of rotors 204 may include a propeller and an actuator (e.g., an electric motor) configured to cause the propeller to rotate in a manner suitable to create sufficient lift to cause drone 200 to fly. Further, in one or more embodiments, rotors 204 may be configured to rotate or tilt about one or more axis to enhance the flight and/or flight control of drone 200. One or more of the rotors 204 may be configured such that the respective propeller is rotated in a clockwise direction (as viewed in FIG. 2), while some may be configured such that the propeller is rotated in a counterclockwise direction. Alternatively, rotors 204 may be configured to selectively rotate the propellers in both the clockwise and counterclockwise direction.

In the depicted embodiment, the payload compartment (or payload mechanism) 206 is positioned below, and may be connected to, fuselage 202. Although not shown in detail, payload compartment 206 may be any container suitable for storing products during the delivery process and may include at least one actuator configured to release (or drop) the products when drone 200 is at a delivery point. For example, payload compartment 206 may include a door or shutter on a lower surface thereof, which when opened, causes the product(s) stored therein to drop from payload compartment 206. Alternatively, the functionality provided by payload compartment 206 may be performed by a clamp or strap-like mechanism, which when opened, releases the product(s). Although payload compartment 206 is shown as having a smaller overall size (at least as viewed in FIG. 2), it should be understood that in some embodiments, payload compartment 206 may be configured to carry, or at least hold, products that have at least one dimension (e.g., a length) that is greater than the lateral width of drone 200. Additionally, in some embodiments, multiple drones 200 may be attached to each other and utilize a single, shared payload compartment (e.g., for particularly large and/or heavy objects).

Still referring to FIG. 2, in the depicted embodiment, frame 208 is substantially rectangular and extends around a periphery of, and may be connected to, rotors 204. Of interest is that frame 208 includes a coupling system that is configured to couple or attach drone 200 to other drones in the manner(s) described herein. In the depicted embodiment, the coupling system includes multiple (e.g., four) coupling mechanisms 210, each of which is positioned on a respective side of the frame 208. Although not shown in detail, each of the coupling mechanisms 210 may include one or more clamps (or other suitable mechanical devices) and/or magnets (e.g., electromagnets, permanent magnets, etc.) configured to cause drone 200 to become coupled (or attached) to other drones. The coupling mechanisms 210 may be shaped in such a way as to minimize wind resistance (or drag). Additionally, although not shown in detail, the drone 200 may include (e.g., within the coupling mechanisms) one or more sensors, such as a camera, that may be used to properly align drone 200 with other drones such that drone 200 can be attached to other drones during flight. Further, as described in detail below, energy transfer lines 224 may extend to or through coupling mechanisms 210 to facilitate controlled sharing of energy between drones of a coupled collective of drones, as described herein.

Figure 3:
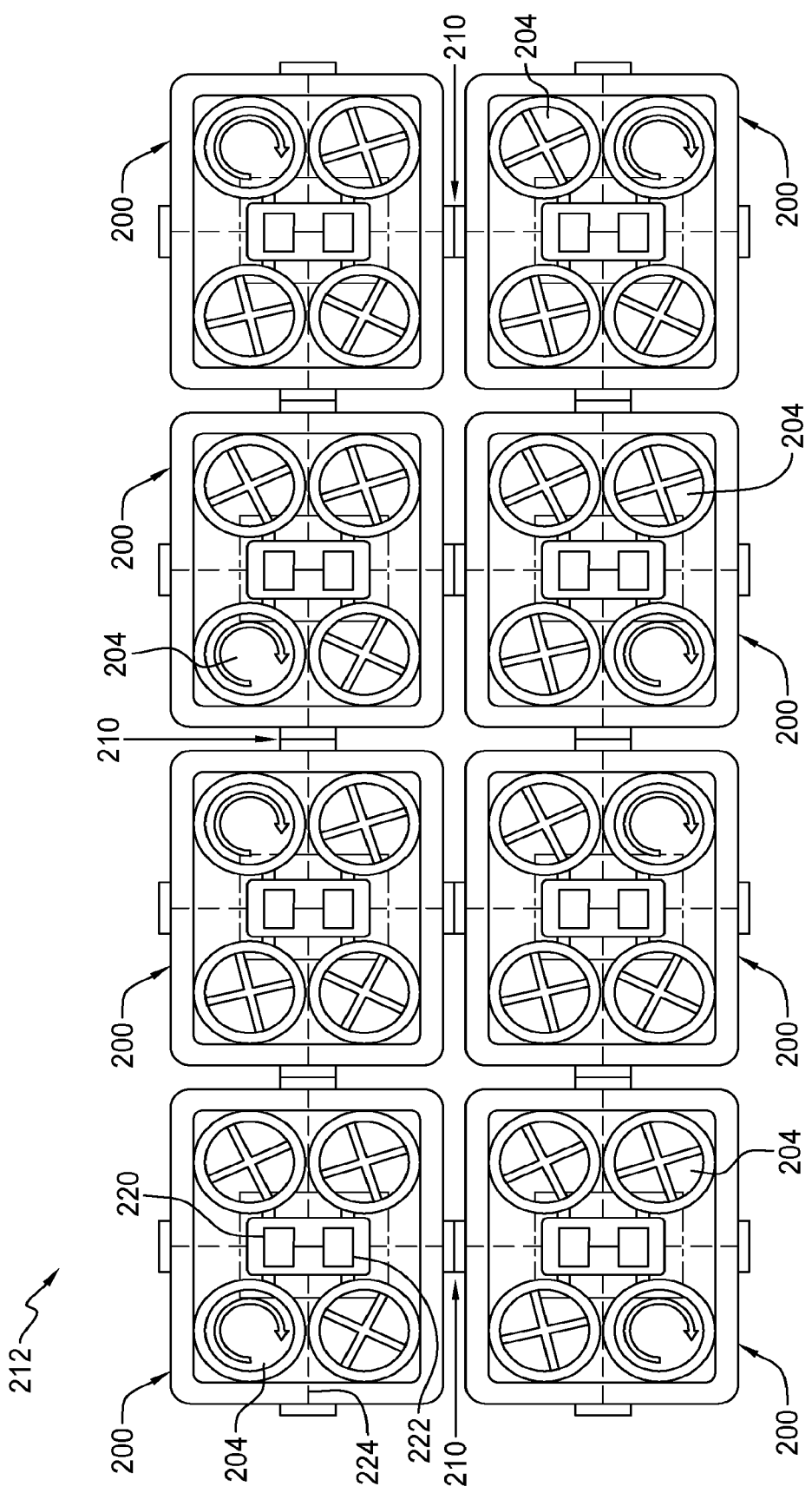
FIG. 3 depicts a plan view of multiple drones in a coupled collective, where the drones have available energy managed, in accordance with one or more aspects of the present invention.

As described above, in at least some embodiments, multiple drones 200 are capable of being attached to each other to form, for example, a coupled collective of drones. FIG. 3 is a plan view of an example of such a coupled collective 212 that may be formed by individual drones 200. In the example shown in FIG. 3, the coupled collective 212 includes (and/or is made of) eight individual drones 200, arranged (or coupled) in a "2×4" configuration (i.e., two rows of four drones). However, it should be understood that different numbers of individual drones 200, in different arrangements, may be used in other embodiments.

The individual drones 200 are coupled to each other, in one or more embodiments, using coupling mechanisms 210 of drones 200. In particular, in the example shown in FIG. 3, each drone 200 is coupled to an adjacent drone(s) by coupling mechanisms 210 of the drones 200. More specifically, coupling mechanisms 210 of each drone 200 mate with and/or are aligned with the coupling mechanisms 210 of the adjacent drone(s) 200. In some embodiments, the coupling mechanisms 210 generate a force (e.g., mechanical and/or magnetic) suitable to hold the individual drones 200 relative to each other in a fixed and relatively rigid manner. For example, in some embodiments, while coupled collective 212 is in flight, coupling mechanisms 210 may hold individual drones 200 together with a force sufficient to keep all of the drones 200 coupled to each other even if none of the rotors 204 on some of the drones 200 are in use. As described above, in one or more embodiments, the individual drones 200 may be coupled to each other to form coupled collective 212 at a warehouse. In one or more other embodiments, the coupled collective 212 may be formed in flight (e.g., after the individual drones 200 have lifted off).

In some embodiments, the arrangement of the individual drones 200 in the coupled collective 212 may be based on the delivery point (i.e., the location thereof) for the product(s) associated with each drone 200. For example, referring to FIG. 1 in combination with FIG. 3, drone 200 that is assigned to make a delivery to delivery point 104 may be positioned at an outer portion (e.g., an end) of the coupled collective 212 because that drone is scheduled to be detached from the collective first. In contrast, the drones 200 that are assigned to make deliveries to delivery points 114 and 116 may be positioned at an inner portion of the collective because those drones are scheduled to be detached last.

It should be noted that the coupled collective embodiment shown in FIG. 3 is as the collective may appear in flight. In particular, the operational state of the rotors 204 of the individual drones 200 should be noted, as some of the rotors 204 are shown as being in operation, as indicated by the depicted rotational arrows, and the rest of the rotors 204 are shown as not being operated (i.e., not in use), as indicated by the stationary appearance of the propellers of those rotors 204. Although all of the operational rotors 204 are shown as rotating the respective propellers in the same direction (e.g., clockwise), it should be understood that in some embodiments, at least some of the propellers may be rotated in the opposite direction (e.g., counterclockwise) in order to, for example, maintain an appropriate amount of control of the flight of the coupled collective 212.

As depicted in the example shown in FIG. 3, eight of the thirty-two rotors 204 in the coupled collective 212 (or one rotor 204 on each of the individual drones 200) are being operated. As such, in the depicted embodiment, each of the individual drones 200 in the collective may be able to obtain flight using, for example, 25% of its maximum power output (or consumption) when utilized in the coupled collective 212 configuration shown. However, if the system determines that additional lift is needed, additional rotors 204 may be selectively utilized. Thus, in some embodiments, the coupled collective 212 of drones may have a range that is greater than that of the individual drones used to form the collective. In one or more embodiments described herein, the drones 200 are further configured and controlled to share and/or transfer battery power (and/or propulsion power), such as through the power transfer lines and the coupling mechanisms.

Figure 4:
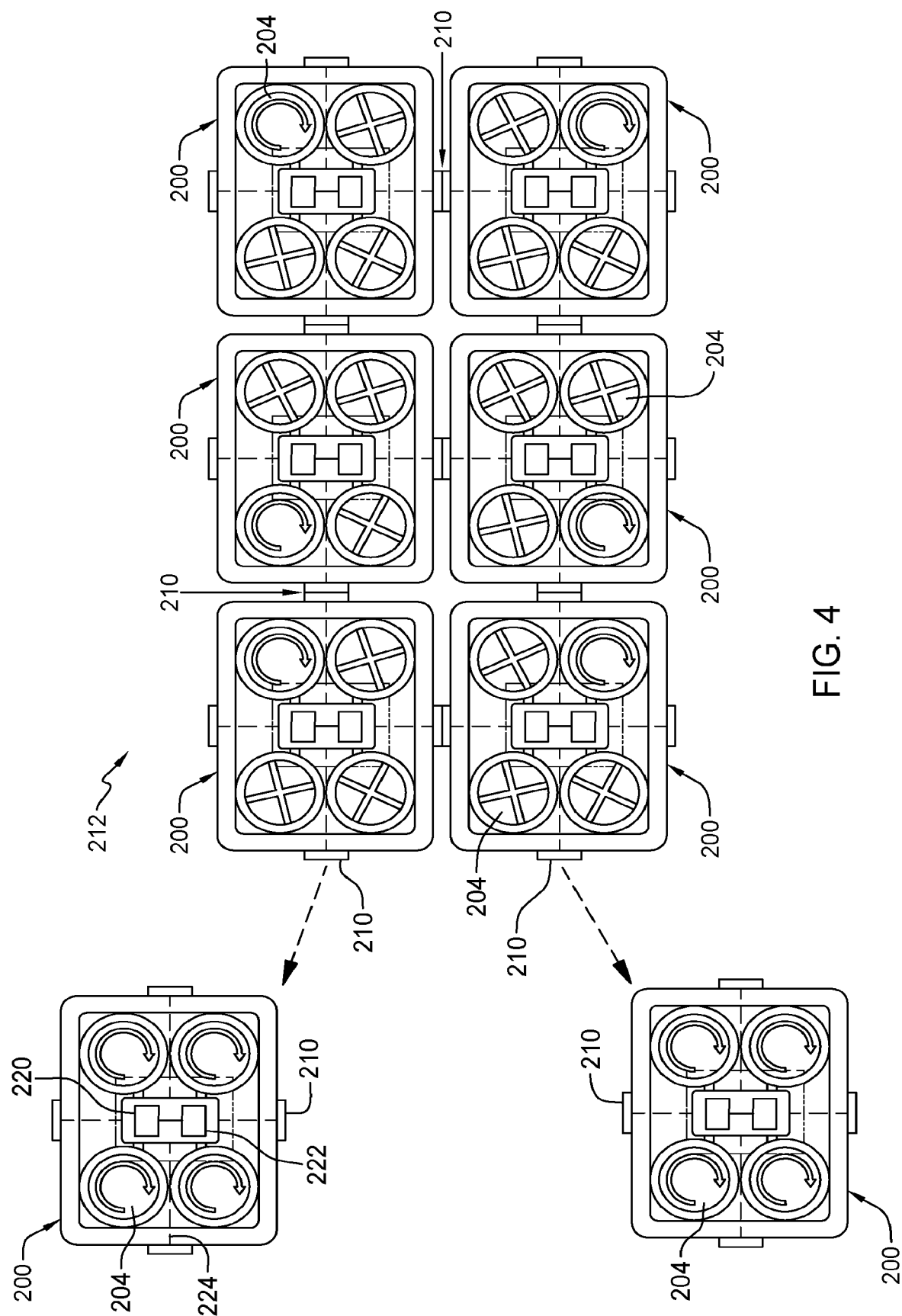
FIG. 4 is a plan view of the coupled collective of FIG. 3, with two of the drones shown decoupling in operation from the other drones, and where the drones have available energy managed, in accordance with one or more aspects of the present invention.

As described above, such as with respect to FIG. 1, in one or more embodiments, at various points along the main delivery route 118, individual drones 200 may detach from the coupled collective 212 to deliver the product(s) stored thereon to the delivery points 104-116. FIG. 4 illustrates the coupled collective 212 after two individual drones 200 have detached from the coupled collective. The detaching of the individual drones 200 may simply be caused by disengaging the appropriate coupling mechanisms 210 and causing the selected drones 200 to fly away from the coupled collective 212. Thus, it should be understood that in at least some embodiments, the individual drones 200 are capable of detaching from the coupled collective 212 while the collective is in flight.

As is shown in FIG. 4, after the two individual drones 200 have detached, the coupled collective 212 includes the six remaining individual drones 200. It should be noted that in at least some embodiments, after the individual drones 200 have detached, the operation of the rotors 204 thereon may change. For example, as shown in FIG. 4, all four rotors 204 on each of the detached individual drones 200 are now in use. It should also be noted that the operational state of at least some of the rotors 204 of the individual drones 200 still connected to the composite drone 212 has changed (when compared to FIG. 3). As will be appreciated by one skilled in the art, the operational state of some of the rotors 204 may be changed in order to, for example, ensure the coupled collective 212 maintains a suitable amount of lift and/or appropriate control of its flight.

Although the two detached drones 200 are shown in FIG. 4 as being individually in flight, in some embodiments, some of the drones 200 may detach from the coupled collective while still attached to each other. In other words, the detached drones 200 may form a second collective (i.e., the large coupled collective 212 may split into two or more smaller collectives). Such functionality may be useful when one of the individual drones 200 is carrying a particularly heavy product, in which case remaining attached to at least one other individual drone 200 (i.e., "helper" drones) may allow the drone 200 carrying the heavy product to share power (e.g., battery power and/or lift generated by rotors). In such an embodiment, after the delivery of the heavy product is made, that particular drone (i.e., the one that was carrying the heavy product) may return to the warehouse (or proceed to some other location), and the "helper" drone(s) may then continue to make their own scheduled deliveries. However, it should be understood, that the "helper" drones may simply be used to assist other drones with making deliveries and not carry any products themselves.

Although not specifically shown, it should be understood that the process depicted in FIGS. 3 and 4 (i.e., individual drones 200 detaching from the coupled collective 212) may be performed in the reverse order, also while the coupled collective 212 and the individual drone(s) 200 are in flight. More specifically, the individual drones 200 that detached from the composite drone 212 in FIG. 4 may be reattached to the collective by, for example, returning to their respective locations shown in FIG. 3 and reengaging the appropriate coupling mechanisms 210. However, in some embodiments, the individual drones 200 may be reattached in a configuration and/or an order that is different than that of the original coupled collective 212. This may be possible because in at least some embodiments, all of the individual drones are identical, or at least substantially identical, and/or have coupling mechanisms 210 on all sides thereof. That is, a particular individual drone 200 may be able to be positioned, for example, within either an interior portion of the coupled collective 212 or on one of the ends.

As noted, in one or more aspects, disclosed herein is a facility for intelligently managing and sharing energy between individual drones in operation, for instance, in a coupled collective (or multi-drone cluster) to enable the drones to complete the assigned tasks. Generally stated, managing available energy among multiple drones may include identifying tasks to be completed by the multiple drones, and determining energy requirements of one or more drones (i.e., the drone(s)) of the multiple drones to facilitate completing one or more tasks (i.e., the task(s)) of the tasks to be completed by the multiple drones. Further, the managing may include identifying an energy sharing approach for completion of the task(s) by the drone(s), where one or more other drones (i.e., the other drone(s)) of the multiple drones transfer energy in operation to the drone(s) to facilitate completion of the task(s).

In one or more implementations, the determining may include determining energy requirements of the other drone(s) of the multiple drones to facilitate completion of one or more other tasks (i.e., the other task(s)) by the other drone(s), and using the energy requirements of the drone(s) and the energy requirements of the other drone(s) in identifying the energy sharing approach. In this embodiment, the other task(s) to be performed by the other drone(s) may be one or more other tasks of the tasks to be completed by the multiple drones.

In one or more implementations, determining the energy requirements may include determining a respective route for each drone, with each respective route including a route portion where the multiple drones travel as a coupled collective of drones, and determining energy requirements of each drone of the multiple drones for completion of a respective task of the multiple tasks to be completed by the multiple drones. Still further, the determining may include determining any lifting requirements for each drone of the multiple drones for completion of the respective task, and a total distance of each respective route of the multiple drones. In addition, the determining may include determining an expected amount of energy each drone will require for completion of that drone's respective task, and based thereon, identifying the energy sharing approach to facilitate transfer of energy from the other drone(s) to the drone(s) while in operation (e.g., while in flight) to facilitate completion of the task(s), while retaining sufficient energy for completion of one or more other tasks by the other drone(s).

In one or more embodiments, managing available energy among multiple drones may further include determining a route for the multiple drones traveling, at least in part, as a coupled collective of drones, and determining individual energy requirements of each drone of the multiple drones to accomplish a respective task of the tasks to be completed by the multiple drones. The multiple drones may be dispatched as the coupled collective of drones, and energy may be transferred from the other drone(s) to the drone(s) while in transit, where the other drone(s) has excess power than required to accomplish the respective task(s) of the other drone(s).

In one or more embodiments, the multiple drones are detachably coupled, and the method further includes implementing the energy sharing approach by transferring energy in operation from the other drone(s) to the drone(s) to facilitate completion of the task(s) prior to decoupling of the other drone(s) from the drone(s). In one or more embodiments, the other drone(s) may decouple in operation from the drone(s) to facilitate completion of one or more other tasks by the other drone(s). The other task(s) may be one or more other tasks of the tasks to be completed by the multiple drones. Transferring energy in operation may include transferring electrical energy in operation to one or more power supplies of the drone(s) from one or more other power supplies of the other drone(s) prior to decoupling in operation of the other drone(s) from the drone(s). In addition, the transferring of electrical energy may be through one or more coupling mechanisms coupling the drone(s) to the other drone(s) in the coupled collective of multiple drones. Further, in one or more other embodiments, the drone(s) may have different power supply requirements for completion of the task(s) from the other drone(s) for completion of one or more other tasks, where the other task(s) is one or more other tasks of the tasks to be completed by the multiple drones, and the drone(s) may require transfer of electrical energy thereto in operation (e.g., in flight) in order to complete the task(s) and return.

In one or more other implementations, a method of managing energy in a multi-drone delivery environment is provided, which includes: managing multiple drones using a computer system; identifying one or more tasks requiring cooperation of the multiple drones; determining energy requirements for each of the drones to complete the one or more tasks, the determining including ascertaining one or more routes of each of the drones and any lifting requirements for each of the drones; and identifying a number of drones and a power sharing technique between the drones for completing the one or more tasks.

In one or more embodiments, the identifying of the number of drones and the energy sharing approach for completing the one or more task may include considering in a delivery system environment, a weight of the package to be delivered, and a distance to travel to complete the task. In one or more implementations, the method may further include determining the expected amount of energy each drone will require to complete its respective task, and transferring energy from one drone to another drone based on the determination of the expected amount of energy each drone will need to complete its task. Note that this transfer occurs while the drones are in operation, for instance, in transit, thereby allowing the drone(s) requiring additional energy to be, for instance, topped off while in transit in order to complete the task(s) in return.

In one or more embodiments, transferring energy from the other drone(s) to the drone(s) when the drones are in operation may occur when the other drone(s) is estimated to not need all of its stored energy to complete its respective task, and it is estimated that the drone(s) will require additional energy in order to complete its task. The method may include considering various types of drones for inclusion in the multiple drones, where two or more of the drones may have different power supply capabilities. Note also that, as noted herein, two or more drones of the multiple drones may be assigned to remain as a coupled collective in order to complete a respective task requiring, for instance, two or more drones to lift a particular package to be delivered.

Figure 5:
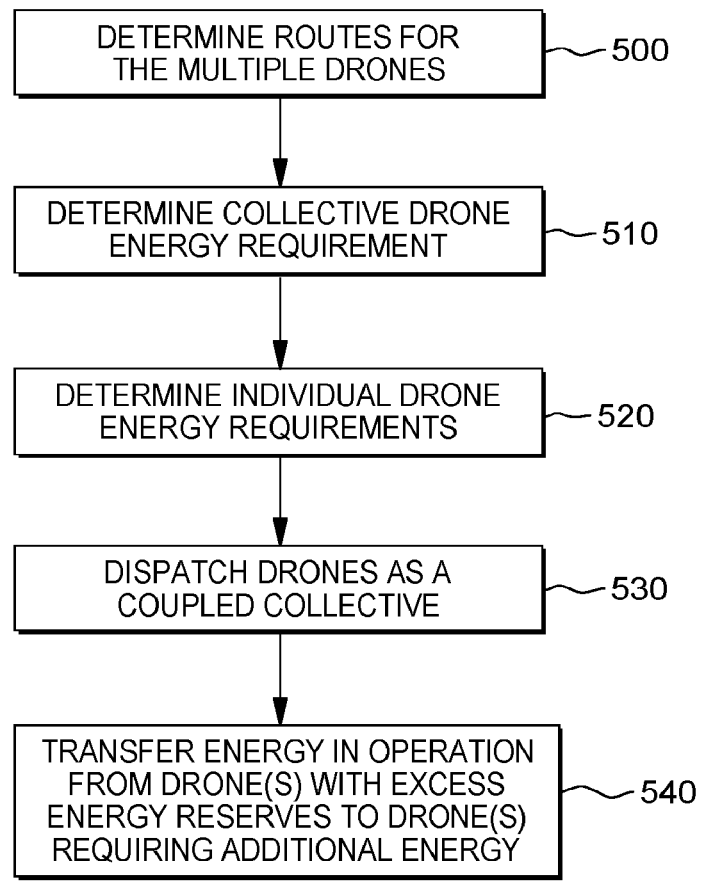
FIG. 5 depicts one embodiment of a process for managing available energy among multiple drones, in accordance with one or more aspects of the present invention.

By way of further example, the energy managing process disclosed herein may include determining that one or more tasks require multiple drones to cooperate for, for instance, optimizing efficiency or simply to complete the assigned tasks. As illustrated in FIG. 5, management processing may determine how much energy will be required to complete all of the tasks. This may include determining routes for the multiple drones 500, including routes that will be taken while the drones are connected together in a coupled collective, and ensuring that there is enough energy to complete all of the tasks. Drones or additional power sources may be added if necessary. The collective drone energy requirement 510 is determined. By way of example, in FIG. 1, the total amount of energy required would be the sum of energy needed for the segment in which multiple drones travel together in the common route plus the segments where the drones travel after they disconnect from the coupled collective. In addition, the drones will either need to be able to return back to the point of origin (e.g., warehouse 102), or meet and couple back up as a coupled collective upon return. As explained herein, certain individual tasks, such as certain deliveries, could require multiple drones to remain coupled together in a smaller coupled collective to manage the particular task, for instance, delivery of a particular payload. The individual power requirement of each drone to complete its task may be determined 520. As discussed, the drones delivering the first packages in the example of FIG. 1 may need significantly less energy than those required to make the later deliveries (depending, in part, on their respective payloads). Thus, the drones making the earlier deliveries could transfer energy to one or more drones of the coupled collective in operation (e.g., in flight in the case of UVA type drones) provided that those drones leave enough energy to make their respective trip back to the origin or collection point. As understood, the payload, in the case of drone deliveries, will need to be considered for each drone in order to determine the amount of energy required by that drone. The collection of drones is dispatched 530, and energy may be transferred in flight from one or more drones with excess energy to one or more drones requiring additional energy 540 to top off while in transient those drones requiring the additional energy. Note in the example of FIG. 5 that one or more of the steps indicated may be reversed, if desired. For instance, a collection of drones could be dispatched, and the energy sharing approach could be determined in flight, in one or more other embodiments.

Note that, in one or more embodiments, a drone may only be provided with enough energy to complete its individual task after decoupling from the coupled collective drones. In such a case, the drone may meet up with one or more other drones return to the point of origin, or collection location, as a collective to lower energy requirements, and/or further share energy. Where excess energy remains in the coupled collective upon return, the excess energy could be transferred to one or more other drones in the coupled collective on the return trip back to the origin or collection point, to immediately allow those one or more other drones to depart with another task upon return. Further, note that energy not needed by one or more drones that will be needed by another drone(s) may not be capable of being accepted by that drone at the time when the first drone disconnects from the coupled collective. This excess energy can be temporarily transferred to an intermediate drone in the coupled collective, which then can continue to perform energy transfer to the drone needing the additional energy prior to disconnecting itself from the coupled collective.

Those skilled in the art should note that a system of managing available power among multiple drones as described herein can take into consideration various types of drones in a fleet having different power supplies. Further, the system can be implemented remotely, at least in part, with the energy sharing approach being, for instance, implemented as a cloud based service. Further, in one or more embodiments, a master drone in the coupled collective could implement one or more aspects of the processing described herein, or a system, for instance, at a warehouse, could determine the desired energy sharing approach for a particular coupled collective before the collective is dispatched.

Further exemplary embodiments of a computing environment to implement one or more aspects of the present invention are described below with reference to FIGS. 6-8.

Figure 6:
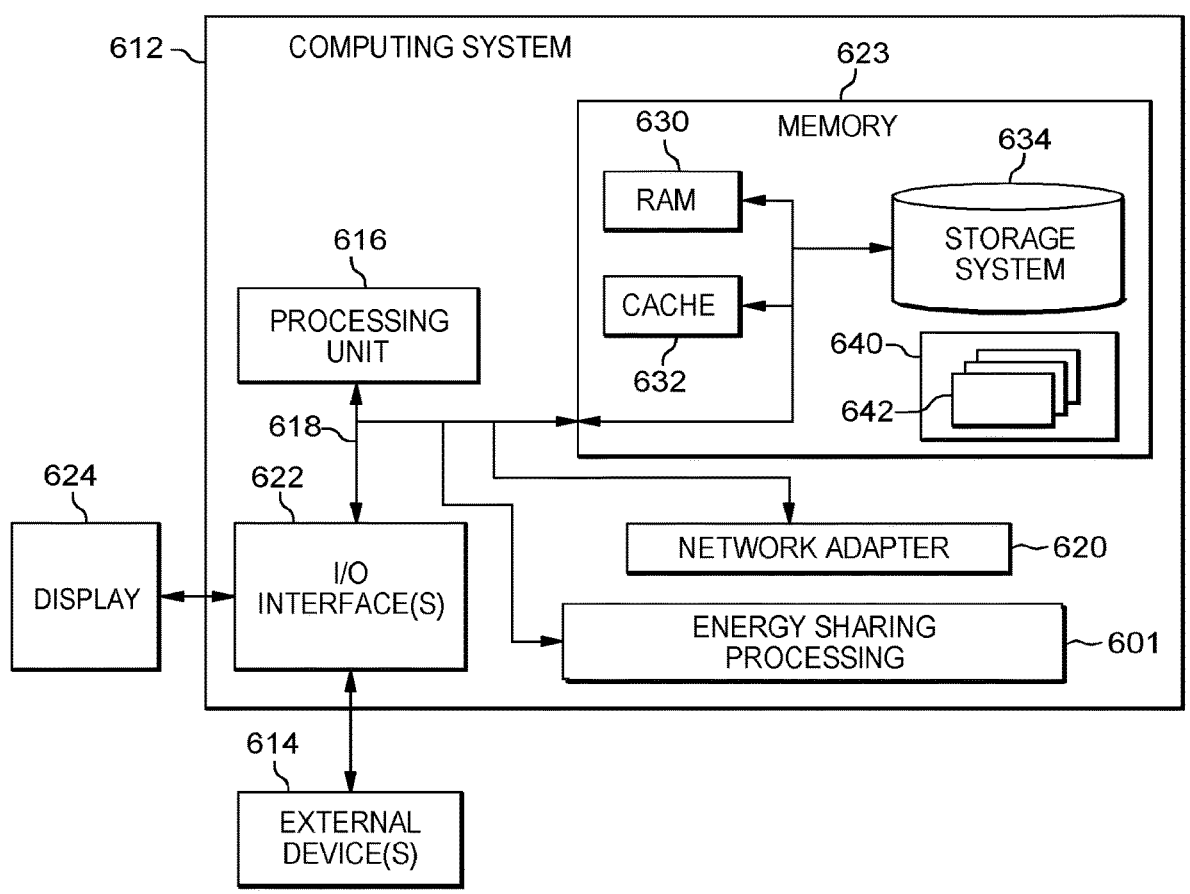
FIG. 6 depicts one embodiment of a computing system which may implement or facilitate implementing managed energy sharing among drones in a coupled collective, in accordance with one or more aspects of the present invention.

By way of further example, FIG. 6 depicts one embodiment of a computing environment 600, which includes a computing system 612. Examples of well-known computing systems, environments, and/or configurations that may be suitable for use with computer system 612 include, but are not limited to, a server, a desktop computer, a workstation, a wireless computer, a handheld or laptop computer or device, a mobile phone, a programmable consumer electronic device, a tablet, a personal digital assistant (PDA), and the like.

Computing system 612 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 6, computing system 612, is shown in the form of a general-purpose computing device. The components of computing system 612 may include, but are not limited to, one or more processors or processing units 616, a system memory 623, and a bus 618 that couples various system components including system memory 623 to processor 616.

In one embodiment, processor 616 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 612 may include a variety of computer system readable media. Such media may be any available media that is accessible by computing system 612, and it includes both volatile and non-volatile media, removable and non-removable media.

System memory 623 can include computer system readable media in the form of volatile memory, such as random access memory (RAM) 630 and/or cache memory 632. Computing system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 618 by one or more data media interfaces. As described below, memory 623 may include at least one program product having a set (e.g., at least one) of program modules that are configured to carry out the functions of embodiments of the invention.

Program/utility 640, having a set (at least one) of program modules 642, may be stored in memory 632 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Alternatively, an energy sharing system, module, logic, etc., 601 may be provided within computing environment 612 for managing energy among multiple drones as described herein.

Computing system 612 may also communicate with one or more external devices 614 such as a keyboard, a pointing device, a display 624, etc.; one or more devices that enable a user to interact with computing system 612; and/or any devices (e.g., network card, modem, etc.) that enable computing system 612 to communicate with one or more other computing devices. Such communication can occur via Input/Output (I/O) interfaces 622. Still yet, computing system 612 can communicate with one or more networks such as a local area network (LAN), a general wide area network (WAN), and/or a public network (e.g., the Internet) via network adapter 620. As depicted, network adapter 620 communicates with the other components of computing system, 612, via bus 618. It should be understood that although not shown, other hardware and/or software components could be used in conjunction with computing system 612. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 6. Computer system/server 612 of FIG. 6 may be practiced in distributed cloud computing environments where tasks are performed by remote processing devices that are linked through a communications network. In a distributed cloud computing environment, program modules may be located in both local and remote computer system storage media including memory storage devices. Computer system/server 612 is capable of being implemented and/or performing any of the functionality set forth hereinabove.

Figure 7:
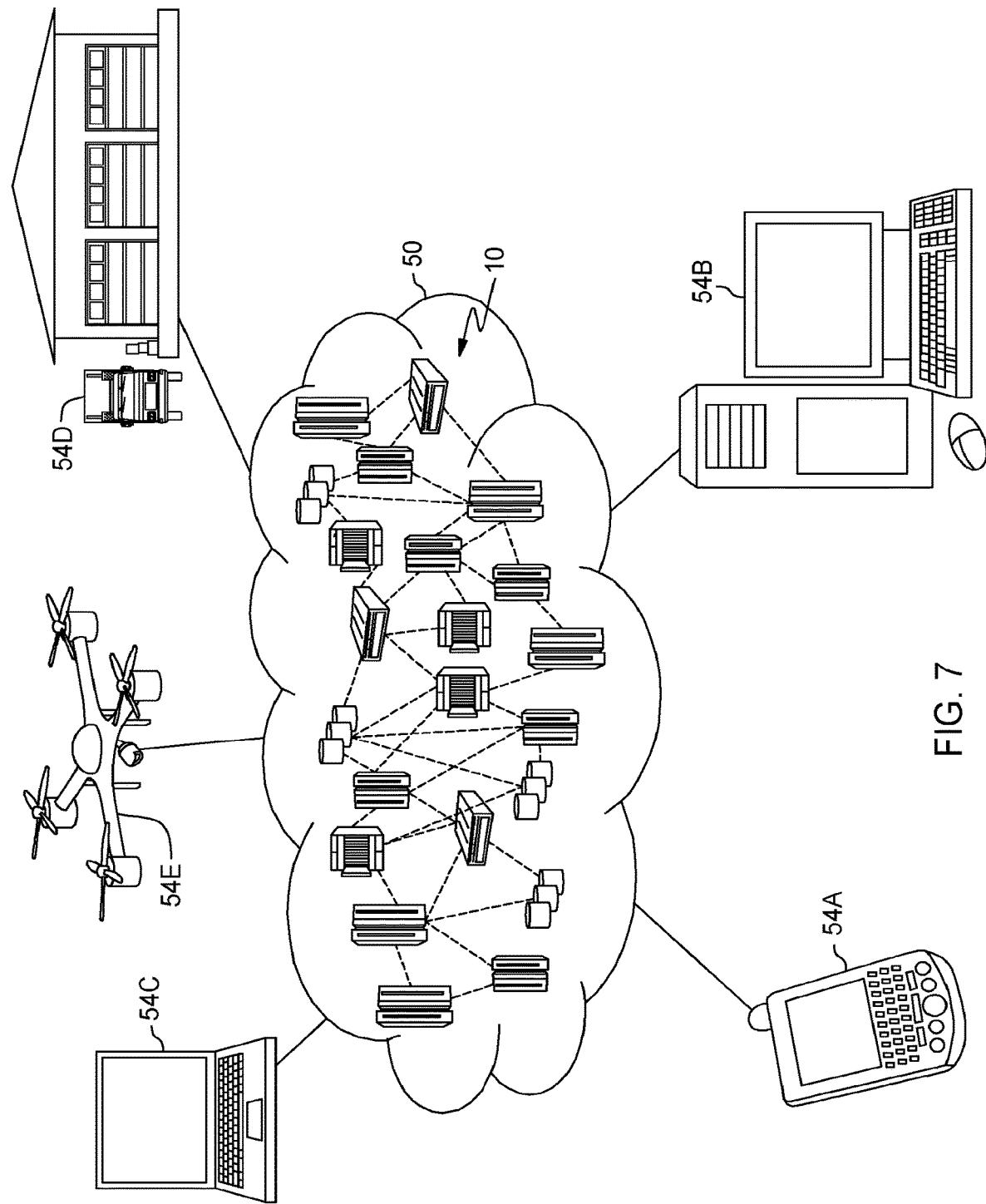
FIG. 7 depicts one embodiment of a cloud computing environment which may facilitate implementing, or be used in association with, with one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or in, for instance, delivery computer systems, such as, those in a warehouse(s) (or other points of origin for deliveries) 54D and/or drone(s) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 7 are intended to be illustrative only and that computing nodes 10 and cloud computing environment 50 can communicate with any type of computerized device over any type of network and/or network addressable connection (e.g., using a web browser).

Figure 8:
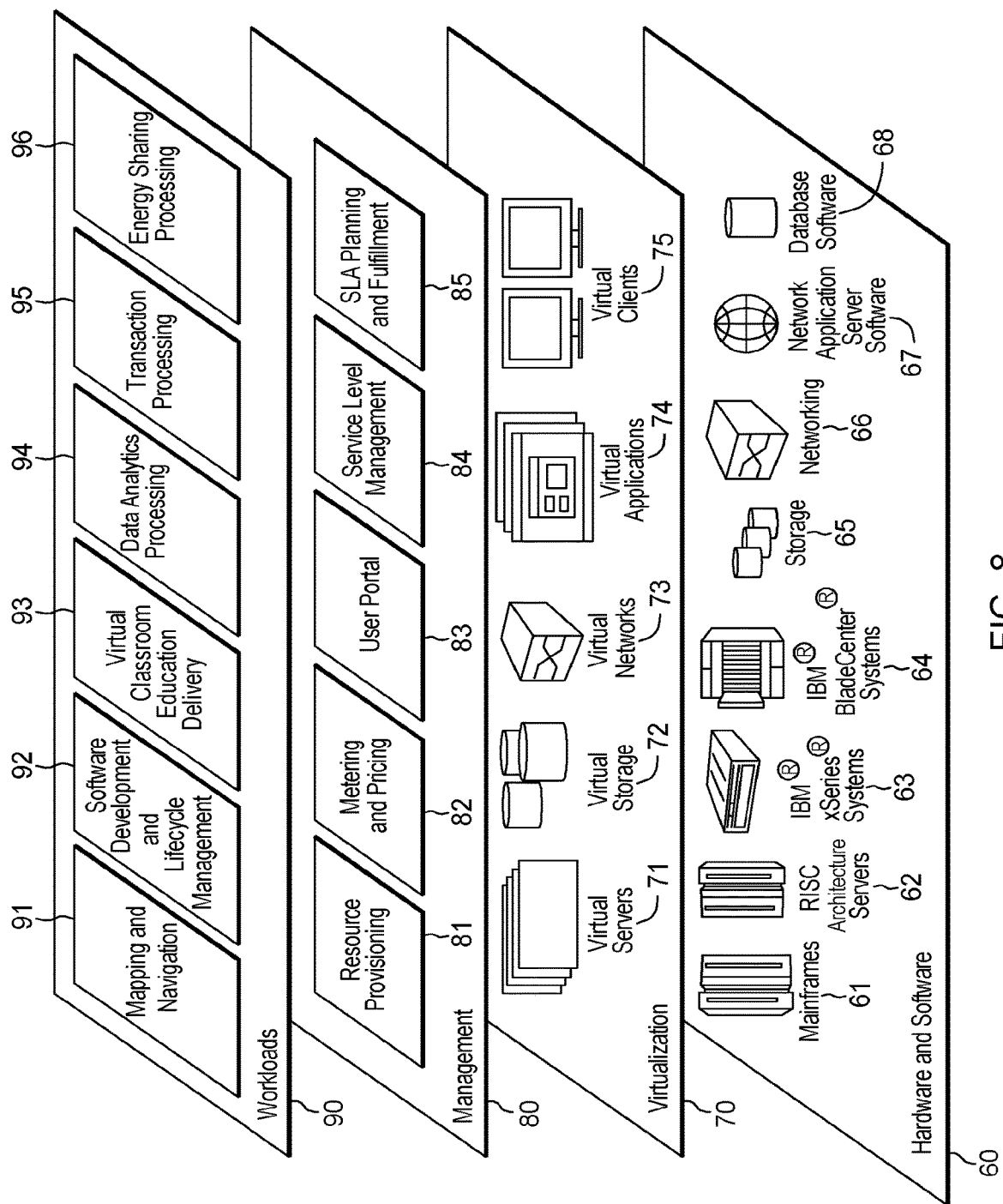
FIG. 8 depicts an example of an extraction model layers, which may facilitate implementing drone energy sharing processing, in accordance with one or more aspects of the present invention.

Referring to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, energy sharing processing 96 for various workloads and functions for managing and controlling drones, and in particular, for managing available power among multiple drones in the context of performing respective tasks by the drones, such as, for instance, making deliveries. One of ordinary skill in the art will appreciate that the energy sharing processing 96 may also work in conjunction with other portions of the various subtraction layers, such as those in hardware and software 60, virtualization 70, management 80, and other workloads 90 (such as data analytics processing 94, for example) to accomplish the various purposes of the illustrated embodiments of the present invention.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of managing available energy among multiple drones, the method comprising:
   identifying tasks to be completed by the multiple drones;
   determining energy requirements of one or more drones of the multiple drones to facilitate completing one or more tasks of the tasks to be completed by the multiple drones;
   identifying an energy sharing approach for completion of the task(s) by the drone(s) where one or more other drones of the multiple drones transfer energy in operation to the drone(s) to facilitate completion of the task(s);
   wherein the determining includes determining a respective route for each drone, each respective route including a route portion where the multiple drones travel as a coupled collective of drones, and the determining comprises determining energy requirements of each drone of the multiple drones for completion of a respective task of the multiple tasks to be completed by the multiple drones; and
   wherein the determining further comprises determining any lifting requirements for each drone of the multiple drones for completion of the respective task and a total distance of each respective route of the multiple drones, and determining an expected amount of energy each drone will require for completion of the drone's respective task, and based thereon, identifying the energy sharing approach to facilitate transfer of energy from the other drone(s) to the drone(s) while in operation to facilitate completion of the task(s), while retaining sufficient energy for completion of one or more other tasks by the other drone(s), the other task(s) being one or more other tasks of the tasks to be completed by the multiple drones.

2. The method of claim 1, wherein the determining further comprises determining energy requirements of the other drone(s) of the multiple drones to facilitate completion of one or more other tasks by the other drone(s), and using the energy requirements of the drone(s) and the energy requirements of the other drone(s) in identifying the energy sharing approach, the other task(s) being one or more other tasks of the tasks to be completed by the multiple drones.

3. The method of claim 1, wherein the drone(s) have different power supply requirements for completion of the task(s) from the other drone(s) for completion of one or more other tasks, the other task(s) being one or more other tasks of the tasks to be completed by the multiple drones, and wherein the drone(s) requires transfer of electrical energy thereto in operation in order to complete the task(s) and return.

4. A system for managing available energy among multiple drones, the system comprising:
    a memory; and
    a processor communicatively coupled to the memory, wherein the system performs a method comprising;
        identifying tasks to be completed by the multiple drones:
        determining energy requirements of one or more drones of the multiple drones to facilitate completing one or more tasks of the tasks to be completed by the multiple drones;
        identifying an energy sharing approach for completion of the task(s) by the drone(s) where one or more other drones of the multiple drones transfer energy in operation to the drone(s) to facilitate completion of the task(s);
        wherein the determining includes determining a respective route for each drone, each respective route including a route portion where the multiple drones travel as a coupled collective of drones, and the determining comprises determining energy requirements of each drone of the multiple drones for completion of a respective task of the multiple tasks to be completed by the multiple drones; and
        wherein the determining further comprises determining any lifting requirements for each drone of the multiple drones for completion of the respective task and a total distance of each respective route of the multiple drones, and determining an expected amount of energy each drone will require for completion of the drone's respective task, and based thereon, identifying the energy sharing approach to facilitate transfer of energy from the other drone(s) to the drone(s) while in operation to facilitate completion of the task(s), while retaining sufficient energy for completion of one or more other tasks by the other drone(s), the other task(s) being one or more other tasks of the tasks to be completed by the multiple drones.

5. The system of claim 4, wherein the determining further comprises determining energy requirements of the other drone(s) of the multiple drones to facilitate completion of one or more other tasks by the other drone(s), and using the energy requirements of the drone(s) and the energy requirements of the other drone(s) in identifying the energy sharing approach, the other task(s) being one or more other tasks of the tasks to be completed by the multiple drones.

6. The system of claim 4, wherein the drone(s) have different power supply requirements for completion of the task(s) from the other drone(s) for completion of one or more other tasks, the other task(s) being one or more other tasks of the tasks to be completed by the multiple drones, and wherein the drone(s) requires transfer of electrical energy thereto in operation in order to complete the task(s) and return.

7. A computer program product for managing available energy among multiple drones, the computer program product comprising:
    a non-transitory computer readable storage medium having computer readable code embodied therewith, the computer readable code being executable by a processor to perform a method comprising:
        identifying tasks to be completed by the multiple drones;
        determining energy requirements of one or more drones of the multiple drones to facilitate completing one or more tasks of the tasks to be completed by the multiple drones;
        identifying an energy sharing approach for completion of the task(s) by the drone(s) where one or more other drones of the multiple drones transfer energy in operation to the drone(s) to facilitate completion of the task(s);
        wherein the determining includes determining a respective route for each drone, each respective route including a route portion where the multiple drones travel as a coupled collective of drones, and the determining comprises determining energy requirements of each drone of the multiple drones for completion of a respective task of the multiple tasks to be completed by the multiple drones; and
        wherein the determining further comprises determining any lifting requirements for each drone of the multiple drones for completion of the respective task and a total distance of each respective route of the multiple drones, and determining an expected amount of energy each drone will require for completion of the drone's respective task, and based thereon, identifying the energy sharing approach to facilitate transfer of energy from the other drone(s) to the drone(s) while in operation to facilitate completion of the task(s), while retaining sufficient energy for completion of one or more other tasks by the other drone(s), the other task(s) being one or more other tasks of the tasks to be completed by the multiple drones.

8. The computer program product of claim 7, wherein the determining further comprises determining energy requirements of the other drone(s) of the multiple drones to facilitate completion of one or more other tasks by the other drone(s), and using the energy requirements of the drone(s) and the energy requirements of the other drone(s) in identifying the energy sharing approach, the other task(s) being one or more other tasks of the tasks to be completed by the multiple drones.

9. The computer program product of claim 7, wherein the drone(s) have different power supply requirements for completion of the task(s) from the other drone(s) for completion of one or more other tasks, the other task(s) being one or more other tasks of the tasks to be completed by the multiple drones, and wherein the drone(s) requires transfer of electrical energy thereto in operation in order to complete the task(s) and return.

\* \* \* \* \*